Oct. 3, 1961 C. BAUR ET AL 3,002,440
DEPTH OF FIELD INDICATOR FOR CAMERAS
Filed Oct. 9, 1958 3 Sheets-Sheet 1

INVENTORS
CARL BAUR
ERICH BURGER
FRIDOLIN HENNIG
BY

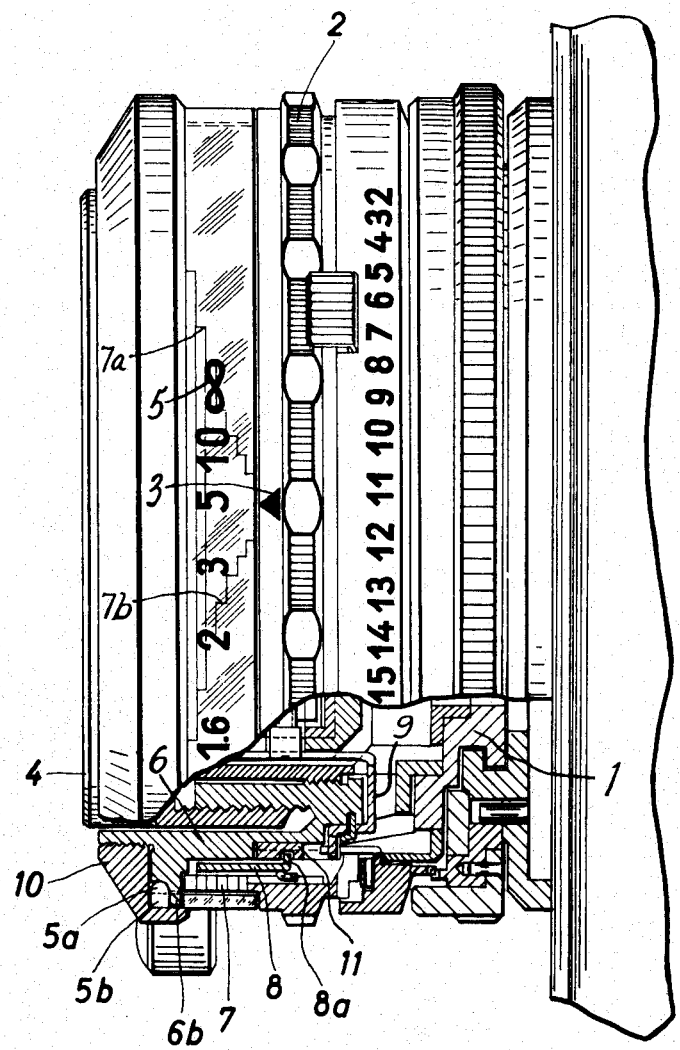

United States Patent Office 3,002,440
Patented Oct. 3, 1961

3,002,440
DEPTH OF FIELD INDICATOR FOR CAMERAS
Carl Baur, Baldham, near Munich, and Erich Burger and Fridolin Hennig, Munich, Germany, assignors to Agfa Aktiengesellschaft, Leverkusen, Germany
Filed Oct. 9, 1958, Ser. No. 766,280
Claims priority, application Germany Jan. 11, 1958
11 Claims. (Cl. 95—44)

The present invention relates to cameras.

More particularly, the present invention relates to a depth of field indicator for cameras.

It is well known that for a given distance of the subject from the camera and for a given size of the aperture of the camera diaphragm everything which is located within a predetermined distance forwardly of and rearwardly of the above given distance of the subject from the camera will be sharply photographed, and this range of distance within which all objects will be sharply photographed is referred to as the depth of field.

The conventional depth of field indicators have several disadvantages. They are relatively complex and can be read only with considerable difficulty and inconvenience and frequently they are spaced from the objective assembly so that the depth of field can only be determined at a location different from that where the camera is adjusted.

One of the objects of the present invention is to provide a depth of field indicator which is of a relatively simple construction and which can easily be read to indicate accurate depth of field ranges.

Another object of the present invention is to provide a depth of field indicator which occupies an extremely small amount of space.

A further object of the present invention is to provide a depth of field indicator which forms part of an objective assembly.

An additional object of the present invention is to provide a depth of field indicator forming part of an objective assembly capable of being removably connected to a camera housing so as to be interchangeable with other objective assemblies.

With the above objects in view the present invention includes in an objective assembly for a camera a stationary tube adapted to be fixedly carried by the camera with its axis coinciding with the optical axis, this stationary tube having front and rear annular edges and being formed with a cutout extending from said front toward the rear edge of the stationary tube. This cutout is widest at the front edge of the stationary tube and narrowest at its end distant from the latter front edge, and the cutout is defined by a pair of opposed indicating edges which are symmetrically arranged with respect to each other. A movable tube is coaxial with and overlaps the stationary tube and has a front annular edge part of which extends from one to the other of the above indicating edges. An aperture adjusting ring is coaxial with these tubes and is turnable about the optical axis for adjusting the size of the aperture of the camera. A means supports the movable tube for axial movement in response to angular turning thereof, and a means connects this movable tube to the adjusting ring to be turned when the latter is turned so that the axial position of the movable tube is indicative of the size of the aperture of the diaphragm of the camera. A focussing ring is coaxial with the above tubes and overlaps the same with a part of the indicia of the focussing ring extending at any angular position thereof from one to the other of the above indicating edges of the stationary tube. The distances indicated on the focussing ring at the intersections of the front edge of the movable ring with the indicating edges of the stationary ring show the depth of field.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a partly sectional side elevational view of an objective assembly which includes another embodiment of a depth of field indicator according to the present invention.

Figure 1:
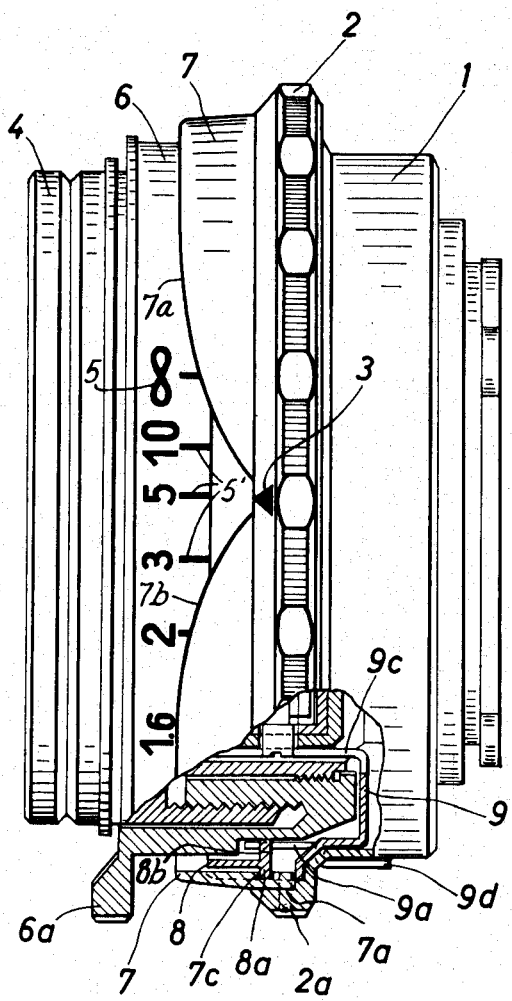
FIG. 1 is a partly sectional side elevational view of one possible objective assembly which includes the depth of field indicator of the present invention.
Figure 2:
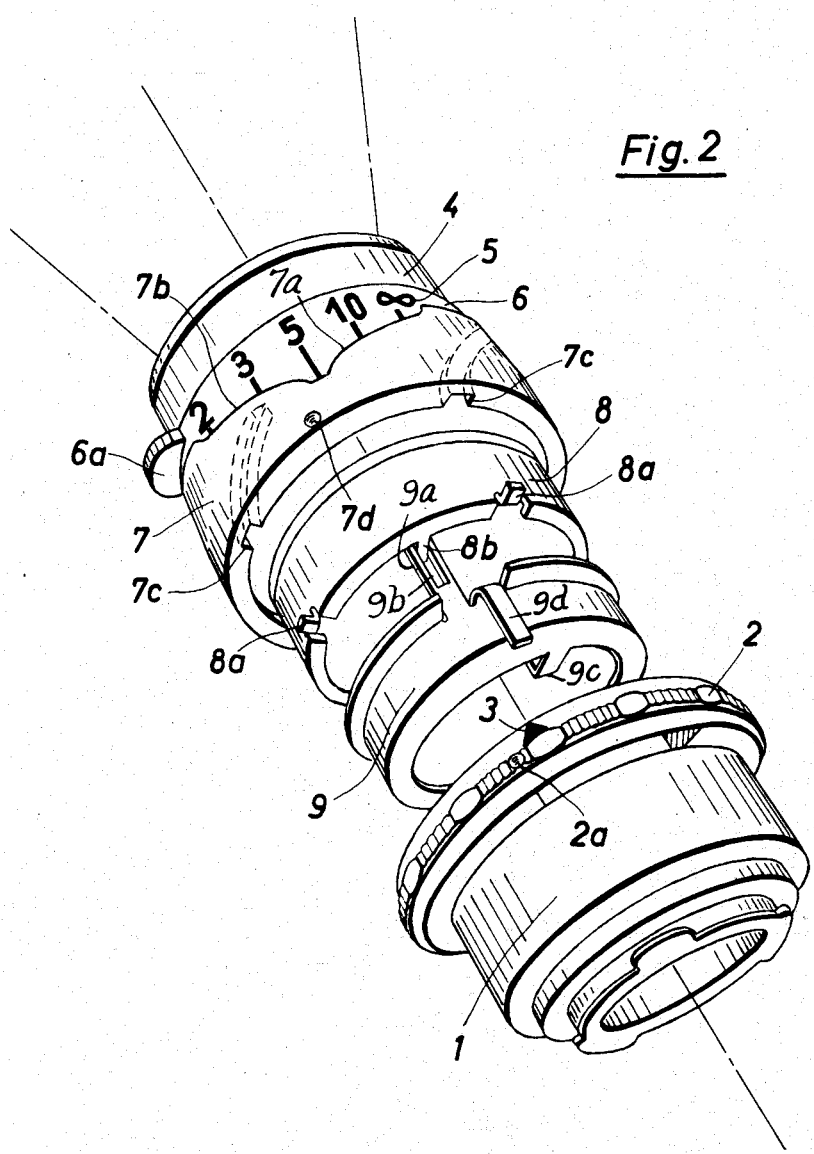
FIG. 2 is an exploded perspective view of the structure of FIG. 1.

Referring now to FIGS. 1 and 2, the objective assembly illustrated therein is capable of being interchangeably interconnected with a camera housing so that one objective assembly may be exchanged for another. The objective assembly of FIGS. 1 and 2 includes a stationary tube 1 having at its rear end bayonet projections adapted to cooperate with bayonet slots formed in the front wall of an unillustrated camera housing for removably fixing the objective assembly to the camera. This tube 1 includes an exterior annular knurled portion 2 for facilitating the connection of the assembly with and the removal thereof from a camera housing. Adjacent to the knurled portion 2 the stationary tube 1 carries a stationary index 3 which cooperates with the distance indicia on the focussing ring 6. The optical elements of the objective which are not illustrated in the drawings are arranged in a known way within a common tubular carrier 4.

In the embodiment of FIGS. 1 and 2 the indicia 5 which indicate the distance of the subject from the camera, in meters, for example, is engraved on the focussing ring 6 provided with a projection 6a to facilitate manual turning of the focussing ring to align a selected distance value of the scale 5 with the index 3. An indicia line 5', extending substantially parallel to the axis of the focus ring, is coordinated with each indicia 5.

A stationary tube 7 which forms part of the depth of field indicator surrounds and overlaps the focussing ring 6. This tube 7 has front and rear edges and is formed with a cutout of generally triangular configuration extending from the front edge of the tube 7 toward the rear edge thereof, being widest at the front edge of the tube 7, narrowest at its end distant from this front edge, and being defined by a pair of opposed indicating edges 7a and 7b which are symmetrical with respect to each other and which are smoothly curved in the embodiment of FIGS. 1 and 2.

The depth of field indicator includes a movable tube 8 which is coaxial with the stationary tube 7 and which is surrounded thereby. A means is provided for moving the tube 8 along the optical axis in response to angular turning thereof, and in the embodiments of FIGS. 1 and 2 this means includes the portion of the stationary tube 7 located next to and including the inner surface thereof and formed at the latter inner surface with three grooves 7c which extend helically with respect to the optical axis and which are angularly displaced from each other by 120°. This means further includes three radial projections of the movable tube 8, shown at 8a, which are also angularly displaced with respect to each other by 120° and which are slidably located in the grooves 7c, respectively, so that when the tube 8 is turned it will move along the optical axis. The front annular edge of the movable tube 8 extends from one to the other of the indicating edges 7a and 7b and at its front edge the tube 8 is colored along an annular portion thereof so that the colored front edge of the tube 8 will be readily visible at the portion thereof extending between the indicating edges 7a and 7b.

The unillustrated diaphragm of the objective assembly is adjusted in a known way upon turning of an aperture adjusting ring 9 which is coaxial with the tubes 7 and 8. A means interconnects the movable tube 8 with the aperture adjusting ring 9 so that the tube 8 will turn when the ring 9 turns, and thus the axial position of the movable tube 8 will be indicative of the size of the aperture of the camera. This means which connects the tube 8 to the ring 9 for turning movement therewith includes a pair of tongues 8b and 9a respectively fixed to and extending from the tube 8 and the ring 9. The tongue 8b extends radially toward the optical axis while the tongue 9a extends parallel to the optical axis and is formed with an axial slot 9b through which the tongue 8b extends, so that in this way the tube 8 is connected to the ring 9 for turning movement therewith while being free to move axially with respect thereto.

The aperture adjusting ring 9 is located between the stationary tubes 1 and 7 and includes an extension 9c connected with the unillustrated diaphragm mechanism for adjusting the aperture thereof in a well known manner. The ring 9 also includes an extension 9d extending through a slot of the tube 1 to the exterior thereof and connected with an unillustrated light value determining device to be actuated thereby. For example, the camera may include an exposure meter which automatically determines the light intensity and which is connected to the extension 9d for automatically turning the ring 9 to an angular position corresponding to the light intensity for automatically setting the aperture of the camera at the proper size.

The stationary tube 7 is provided with one or more threaded radial bores 7d adapted to be respectively aligned with one or more threaded radial bores 2a of the stationary tube 1 and suitable screws are located in the aligned threaded bores for fixedly connecting the stationary tube 7 to the stationary tube 1.

In order to set the objective at a given distance of the subject from the camera, the focussing ring 6 is turned to align the proper value of the scale 5 with the stationary index 3. The ring 9 is automatically turned by an exposure meter in the manner described above, or if desired the ring 9 can be turned through a manually turnable aperture adjusting ring located on the tube 1, connected to the extension 9d, and having a scale indicating various aperture sizes. Also, the objective may have the exposure time and aperture adjusting devices interconnected to provide together a given total light value corresponding to the combination of exposure time and aperture size, and in this case the interconnected exposure time and aperture adjusting unit is connected with the ring 9 to turn the latter. As a result of the above-described connection of the ring 9 to the movable tube 8, the latter will be automatically located at an axial position indicative of the size of the aperture. Thus, the colored front edge of the movable tube 8 which is visible between the indicating edges 7a and 7b has an axial position determined by the aperture size. In accordance with the axial position of the movable tube 8, its front annular edge will intersect the indicating edges 7a and 7b at predetermined points which will be different for different aperture sizes. The scale 5 of the focussing ring 6 will have certain distance values located at the intersections between the front edge of the tube 8 and the indicating edges 7a and 7b, and the distances indicated on the scale 5 at these intersections show the depth of field. For example, in the example shown in FIG. 1 where focussing ring is set at a distance of 5 meters the edge of the movable ring 8 intersects the indicating edges 7a and 7b at values on the scale 5 which are respectively equal to approximately 2.8 meters and half way between 10 meters and infinity.

Thus, the operator immediately knows from the depth of field indicator of the invention that with the particular aperture size of FIG. 1 at the set distance of 5 meters the depth of field ranges from approximately 2.8 meters to a value approximately half between 10 meters and infinity.

In the embodiment of the invention which is illustrated in FIG. 3, there is an outer focussing ring 5 made of a transparent material and of a larger diameter than and surrounding the tube 7 which in turn surrounds the tube 8 in the manner described above. This focussing ring 5 may be made of any suitable transparent substantially rigid plastic material. This outer ring 5 is carried by an inner objective adjusting ring 6. To provide a secure connection between the rings 5 and 6 which together form the focussing ring means of the embodiment of FIG. 3, the ring 5 has an integral inwardly directed radial projection 5a extending into a mating recess of the inner ring 6, and the latter is provided with a plurality of outwardly directed radial projections 6b respectively extending into mating cutouts 5b of the ring 5 so that the rings 5 and 6 are interconnected in a manner preventing turning movement thereof one with respect to the other and thus limiting them to turning movement together. Moreover, the ring 6 threadedly carries an outer ring 10 having an annular flange overlapping the front edge portion of the ring 5 to maintain the latter on the ring 6, so that with this arrangement it is possible to exchange one ring 5 for another ring 5.

Also, in the embodiment of FIG. 3 the projections 8a of the movable tube 8 are not located in grooves formed in the inner surface of the tube. Instead these projections respectively extend into helical grooves formed in a separate tube 11. This tube 11 is connected with the ring 9 for turning movement therewith so that with the embodiment of FIG. 3 the tube 8 advances axially with respect to the optical axis in response to turning of the tube 11 with the ring 9. As is shown at the lower portion of FIG. 3, the tube 8 of this embodiment has a lower projection extending into an axial groove formed in the inner surface of the stationary tube 1, so that in this embodiment the tube 8 cannot turn and only moves back and forth along the optical axis in response to turning of the tube 11 whose exterior helical grooves act on the projections 8a for shifting the tube 8.

The tube 11 may form an integral part of the ring 9 in the embodiment of FIG. 3 and is turnable on the exterior surface of the ring 6 in the manner shown in FIG. 3.

It will also be noted that in the embodiment of FIG. 3 the indicating edges 7a and 7b of the stationary tube 7 are not smoothly curved and instead are stepped in the manner shown in FIG. 3.

Upon using a transparent ring 5 as shown in the embodiment of FIG. 3, the scale need not be engraved or colored, and instead it can simply be formed by raised portions of the ring 5.

The embodiment of FIG. 3 operates in the same way as the embodiment of FIGS. 1 and 2. The axial position of the tube 8 will be determined by the size of the apertures set into the camera by turning of the ring 9, and the values shown in the scale 5 at the intersections between the front edge of tube 8 with the stepped indicating edges 7a and 7b show the depth of field.

Of course, the depth of field indicator of the invention need not necessarily be located only on a stationary locking part of an interchangeable objective assembly, but instead can also be arranged directly on the camera housing.

It will be understood that each of the elements described above, or two or more together, may also find a useful application in other types of cameras differing from the types described above.

While the invention has been illustrated and described as embodied in depth of field indicators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a rotary focussing ring having angularly distributed distance indicia lines extending substantially parallel to the axis of said focussing ring, said focussing ring having front and rear edges; a stationary ring forming part of a depth of field indicator, said stationary ring being coaxial with said focussing ring and having a front end portion provided with a pair of indicating edges symmetrically arranged with respect to each other, respectively having rear ends located adjacent each other adjacent the rear edge of said focussing ring, and respectively progressing from said rear ends away from each other and up to front ends of said indicating edges, respectively, which are angularly displaced from each other at a distance greater than said rear ends and which are nearer to said front edge of said focussing ring than said rear ends, said indicating edges overlapping said focussing ring; a movable ring forming another part of the depth of field indicator, said movable ring being coaxial with said stationary ring and having a front annular edge located between the front and rear ends of said indicating edges intersecting the same at spaced points of intersection and intersecting the indicia lines located between said spaced points of intersection so as to cover the portions of said indicia lines extending beyond the front edge of said movable ring while the remaining indicia lines are covered to a greater extent by said stationary ring; means supporting said movable ring for movement along the common axis of all of said rings, the position of said front edge of said movable ring between the ends of said indicating edges giving a reading on the focussing ring of the distance at the intersection of said front edge of said movable ring with one of said indicating edges to the distance indicated on the focussing ring at the intersection of the latter front edge with the other of said indicating edges, said reading being the depth of field for a given distance of the subject from the camera and for a given aperture size; and aperture regulating means cooperating with said movable ring for axially moving the same to an axial position corresponding to the size of the aperture of the camera.

2. In an objective assembly for a camera, in combination, a stationary tube adapted to be fixedly carried by the camera with its axis coinciding with the optical axis, said tube having front and rear annular edges and being formed with a cutout extending from said front toward said rear edge, being widest at said front edge and narrowest at its end distant from said front edge and defined by a pair of opposed indicating edges symmetrically arranged with respect to each other; a movable tube coaxial with said stationary tube and having a front annular edge part of which extends from one to the other of said indicating edges; an aperture adjusting ring coaxial with said tubes for adjusting the size of the aperture of the camera when said aperture adjusting ring is turned about the optical axis; means supporting said movable tube for axial movement, said means being formed by a tubular portion having a surface directed toward said movable tube and formed with at least one groove extending helically with respect to the optical axis and a projection integral with said movable tube and located in said groove; means connecting said movable tube to said adjusting ring to be axially moved when the latter is turned so that the axial position of said movable tube is indicative of the size of the aperture; and a focussing ring coaxial with said tubes and overlapping the same with a part of the indicia on the focussing ring extending from one to the other of said indicating edges, the distances indicated on the focussing ring at the intersections of said front edge of said movable ring with said indicating edges showing the depth of field.

3. In an objective assembly as recited in claim 2, said stationary tube being of a larger diameter than and surrounding said movable tube.

4. In an objective assembly as recited in claim 3, said focussing ring being of a smaller diameter than and surrounded by said movable tube.

5. In an objective assembly as recited in claim 2, said stationary tube being of a larger diameter than and surrounding said movable tube and said tubular portion forming part of said stationary tube, said groove being formed in the inner surface of said stationary tube and said movable tube being connected to said adjusting ring to turn therewith.

6. In an objective assembly as recited in claim 2, said tubular portion being formed by an additional tube coaxial with said movable tube and connected to said adjusting ring to turn therewith, said movable tube being restrained from angular turning.

7. In an objective assembly as recited in claim 2, said movable tube having an annular colored portion located at its front edge.

8. In an objective assembly for a camera, in combination, a stationary tube adapted to be fixedly carried by the camera with its axis coinciding with the optical axis, said tube having front and rear annular edges and being formed with a cutout extending from said front toward said rear edge, being widest at said front edge and narrowest at its end distant from said front edge and defined by a pair of opposed indicating edges symmetrically arranged with respect to each other; a movable tube coaxial with said stationary tube and having a front annular edge part of which extends from one to the other of said indicating edges; an aperture adjusting ring coaxial with said tubes for adjusting the size of the aperture of the camera when said aperture adjusting ring is turned about the optical axis; means supporting said movable tube for axial movement; means connecting said movable tube to said adjusting ring to be axially moved when the latter is turned so that the axial position of said movable tube is indicative of the size of the aperture; a focussing ring coaxial with said tubes and overlapping the same with a part of the indicia on the focussing ring extending from one to the other of said indicating edges, the distances indicated on the focussing ring at the intersections of said front edge of said movable ring with said indicating edges showing the depth of field; and an inner objective adjusting ring coaxial with and located within said focussing ring, said objective adjusting ring being formed with a recess and said focussing ring having a projection extending into said recess and said adjusting ring being formed with at least one cutout, said inner objective adjusting ring having a projection extending into the latter cutout, so that said focussing ring and inner objective adjusting ring are mutually interlocked to prevent angular displacement of said focussing ring with respect to said inner objective adjusting ring.

9. In an objective assembly as recited in claim 8, means removably connecting said focussing ring to said inner objective adjusting ring so that one focussing ring may be replaced by another.

10. In an objective assembly as recited in claim 2, said indicating edges being smoothly curved.

11. In an objective assembly for a camera, in combination, a stationary tube adapted to be fixedly carried by the camera with its axis coinciding with the optical axis, said tube having front and rear annular edges and being formed with a cutout extending from said front to said rear edge, being widest at said front edge and narrowest at its end distant from said front edge and defined by a pair of opposed indicating edges symmetrically arranged with respect to each other; a movable tube coaxial with said stationary tube and having a front annular edge part of which extends from one to the other of said indicating edges; an aperture adjusting ring coaxial with said tubes for adjusting the size of the aperture of the camera when said aperture adjusting ring is turned about the optical axis; means supporting said movable tube for axial movement; means connecting said movable tube to said adjusting ring to be axially moved when the latter is turned so that the axial position of said movable tube is indicative of the size of the aperture, said connecting means including a pair of tongues respectively fixed to and extending from said movable tube and said aperture adjusting ring, one of said tongues being formed with a slot extending parallel to the optical axis and the other of said tongues extending through said slot; and a focussing ring coaxial with said tubes and overlapping the same with a part of the indicia on the focussing ring extending from one to the other of said indicating edges, the distances indicated on the focusisng ring at the intersections of said front edge of said movable ring with said indicating edges showing the depth of field.

References Cited in the file of this patent

UNITED STATES PATENTS

| | | |
|---|---|---|
| 2,258,635 | Uffrecht | Oct. 14, 1941 |
| 2,315,977 | Mihalyi | Apr. 6, 1943 |
| 2,527,106 | Smith | Oct. 24, 1950 |

FOREIGN PATENTS

| | | |
|---|---|---|
| 926,768 | Germany | Apr. 25, 1955 |